(12) United States Patent
Medvedev et al.

(10) Patent No.: US 8,732,838 B2
(45) Date of Patent: May 20, 2014

(54) EVALUATING THE EFFECTIVENESS OF A THREAT MODEL

(75) Inventors: Ivan Medvedev, Bellevue, WA (US);
Adam Shostack, Seattle, WA (US);
Lawrence William Osterman,
Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1396 days.

(21) Appl. No.: 12/146,537

(22) Filed: Jun. 26, 2008

(65) Prior Publication Data

US 2009/0328223 A1    Dec. 31, 2009

(51) Int. Cl.
*G06F 21/50* (2013.01)

(52) U.S. Cl.
USPC .............................. 726/25; 717/126; 714/741

(58) Field of Classification Search
CPC ..................................................... G06F 21/577
USPC .......................................................... 726/25
See application file for complete search history.

(56) References Cited

U.S. PATENT DOCUMENTS

| | | | |
|---|---|---|---|
| 6,219,805 B1 | 4/2001 | Jones et al. | |
| 6,681,383 B1 * | 1/2004 | Pastor et al. | 717/126 |
| 6,883,101 B1 * | 4/2005 | Fox et al. | 726/25 |
| 7,243,374 B2 | 7/2007 | Howard et al. | |
| 2005/0086530 A1 | 4/2005 | Goddard | |
| 2005/0268326 A1 | 12/2005 | Bhargavan et al. | |
| 2007/0016955 A1 | 1/2007 | Goldberg et al. | |
| 2007/0162890 A1 | 7/2007 | Meier et al. | |
| 2007/0192344 A1 | 8/2007 | Meier et al. | |
| 2007/0199050 A1 | 8/2007 | Meier | |
| 2007/0294766 A1 | 12/2007 | Mir et al. | |
| 2008/0126902 A1 * | 5/2008 | Hickman et al. | 714/741 |

OTHER PUBLICATIONS

Marwan Abi-Antoun, Daniel Wang, and Peter Torr. Sep. 2006. "Checking threat modeling data flow diagrams for implementation conformance and security." Retrieved online Nov. 29, 2011 (http://www.cs.cmu.edu/~mabianto/papers/CMU-ISRI-06-124.pdf).*
Yonglei Tao, Chenho Kung, Formal definition and verification of data flow diagrams, Journal of Systems and Software, vol. 16, Issue 1, Sep. 1991, pp. 29-36, ISSN 0164-1212, 10.1016/0164-1212(91)90029-6.*
Xu, D.; Nygard, K.E.; , "Threat-driven modeling and verification of secure software using aspect-oriented Petri nets," Software Engineering, IEEE Transactions on , vol. 32, No. 4, pp. 265-278, Apr. 2006.*
S. Myagmar, A. J. Lee, and W. Yurcik. Threat Modeling as a Basis for Security Requirements (SREIS). In Symposium on Requirements Engineering for Information Security, 2005.*

(Continued)

*Primary Examiner* — Taghi Arani
*Assistant Examiner* — Syed Zaidi
(74) *Attorney, Agent, or Firm* — Dan Choi; Carole Boelitz; Micky Minhas (57) ABSTRACT

Evaluating a threat model for structural validity and descriptive completeness. A threat modeling application provides a progress factor or other overall score associated with the structural validity and descriptive completeness of the threat model being evaluated. The structural validity is evaluated based on a data flow diagram associated with the threat model. The descriptive completeness is evaluated by reviewing descriptions of threat types in the threat model. The progress factor encourages modelers to provide effective models to a model reviewer, thus saving time for the model reviewer.

20 Claims, 11 Drawing Sheets

(56) References Cited

OTHER PUBLICATIONS

Boehm, et al., "Value Driven Security Threat Modeling Based on Attack Path Analysis", Proceedings of the 40th Annual Hawaii International Conference on System Sciences, Date: 2007, 9 Pages, Publisher: IEEE Computer Society Washington, DC, USA.

"Threat Modeling Tool", Date: Jun. 28, 2004, 2 Pages, http://www.microsoft.com/downloads/details.aspx?familyid=62830f95-0e61-4f87-88a6-e7c663444ac1 &displaylang=en#QuickInfoContainer.

"Threat Model Your Security Risks", Copyright: 2008, 1 Page, http://msdn2.microsoft.com/en-us/magazine/cc164068.aspx.

* cited by examiner

Threat Model — File Edit Actions Help

2. Analyze Model

- All Elements
  - ☑ 1. Read Uncom...
  - ☑ 2. Write Compr...
  - ☑ Enumerate cap...
  - ☑ Pass metadata...
  - ☑ Pass pointer to...
  - ☑ Query capabiliti...
  - ☑ Request process...
  - ☑ Retrieve Image...
  - ☑ Return Bitmap...
  - ☑ Save Image file...
  - Image file
  - Application 1. Draw Diagrams
2. Analyze Model
3. Describe Environment
4. Generate Reports

602

| ID | Element Name | Element Type | Element Diagram Ref. | Threat Type | Completion |
|----|---|---|---|---|---|
| 66 | Request Pro... | Dataflow | Context | DenialOfService | |
| 61 | Retrieve Ima... | Dataflow | Context | Tampering | |
| 62 | Retrieve Ima... | Dataflow | Context | InformationDisc... | |
| 63 | Retrieve Ima... | Dataflow | Context | DenialOfService | |
| 67 | Return bitm... | Dataflow | Context | Tampering | |
| 68 | Return bitm... | Dataflow | Context | InformationDisc... | |
| 69 | Return bitm... | Dataflow | Context | DenialOfService | |
| 58 | Save Image... | Dataflow | Context | Tampering | |
| 59 | Save Image... | Dataflow | Context | InformationDisc... | |
| 60 | Save Image... | Dataflow | Context | DenialOfService | |
| 21 | Image file | DataStore | Context | Tampering | |
| 22 | Image file | DataStore | Context | Repudiation | |
| 23 | Image file | DataStore | Context | InformationDisc... | |
| 1 | Image file | DataStore | Context | DenialOfService | |
| 2 | Image file | DataStore | Context | DenialOfService | |
| 24 | Image file | DataStore | Context | DenialOfService | |
| 3 | Application... | Interactor | Context | Spoofing | |
| 4 | Application... | Interactor | Context | Repudiation | |
| 52 | 3.FS Compr... | Process | Context | (Informational) | |
| 15 | CODEC | Process | Context | Spoofing | |
| 16 | CODEC | Process | Context | Tampering | |

| ID | Element Name | Element Type | Element Diagram Ref. | Threat Type |
|---|---|---|---|---|
| 61 | Retrieve Ima... | Dataflow | Context | Tampering |
| 62 | Retrieve Ima... | Dataflow | Context | InformationDisc... |
| 63 | Retrieve Ima... | Dataflow | Context | DenialOfService |
| 67 | Return bitm... | Dataflow | Context | Tampering |
| 68 | Return bitm... | Dataflow | Context | InformationDisc... |
| 69 | Return bitm... | Dataflow | Context | DenialOfService |
| 58 | Save Image... | Dataflow | Context | Tampering |
| 59 | Save Image... | Dataflow | Context | InformationDisc... |
| 60 | Save Image... | Dataflow | Context | DenialOfService |
| 21 | Image file | DataStore | Context | Tampering |
| 22 | Image file | DataStore | Context | Repudiation |
| 23 | Image file | DataStore | Context | InformationDisc... |
| 1 | Image file | DataStore | Context | DenialOfService |
| 2 | Image file | DataStore | Context | DenialOfService |
| 24 | Image file | DataStore | Context | DenialOfService |
| 3 | Application... | Interactor | Context | Spoofing |
| 4 | Application... | Interactor | Context | Repudiation |
| 52 | 3.FS Compr... | Process | Context | (Informational) |
| 15 | CODEC | Process | Context | Spoofing |
| 16 | CODEC | Process | Context | Tampering |
| 16 | CODEC | Process | Context | Tampering |

EVALUATING THE EFFECTIVENESS OF A THREAT MODEL

BACKGROUND

A threat model is a conception tool for identifying security risks in software and other information systems. Threat modeling often includes an analysis of a data flow diagram. Data flow diagrams describe the movement of information in an information system such as a software system, the sources of information, what processes occur on the information, where the information is stored, and where the information eventually flows. The effectiveness of a threat model is dependent upon, for example, the structural validity and completeness of the threat model. Existing systems fail to evaluate the effectiveness of the threat model prior to threat model being reviewed by a model reviewer such as a security expert.

SUMMARY

Embodiments of the invention evaluate a threat model for effectiveness. Portions of a data flow diagram associated with the threat model are received. The threat model has one or more threat types corresponding to each of the elements in the data flow diagram. Connections between the elements are evaluated as the portions are received to generate a validity factor for each of the threat types. The generated validity factor is provided to a user for analysis of the threat model. In some embodiments, a description of each of the threat types for each of the elements is evaluated to generate a completeness factor for the threat type. The validity factor and the completeness factor are provided to the user as a progress factor for the threat model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 5:
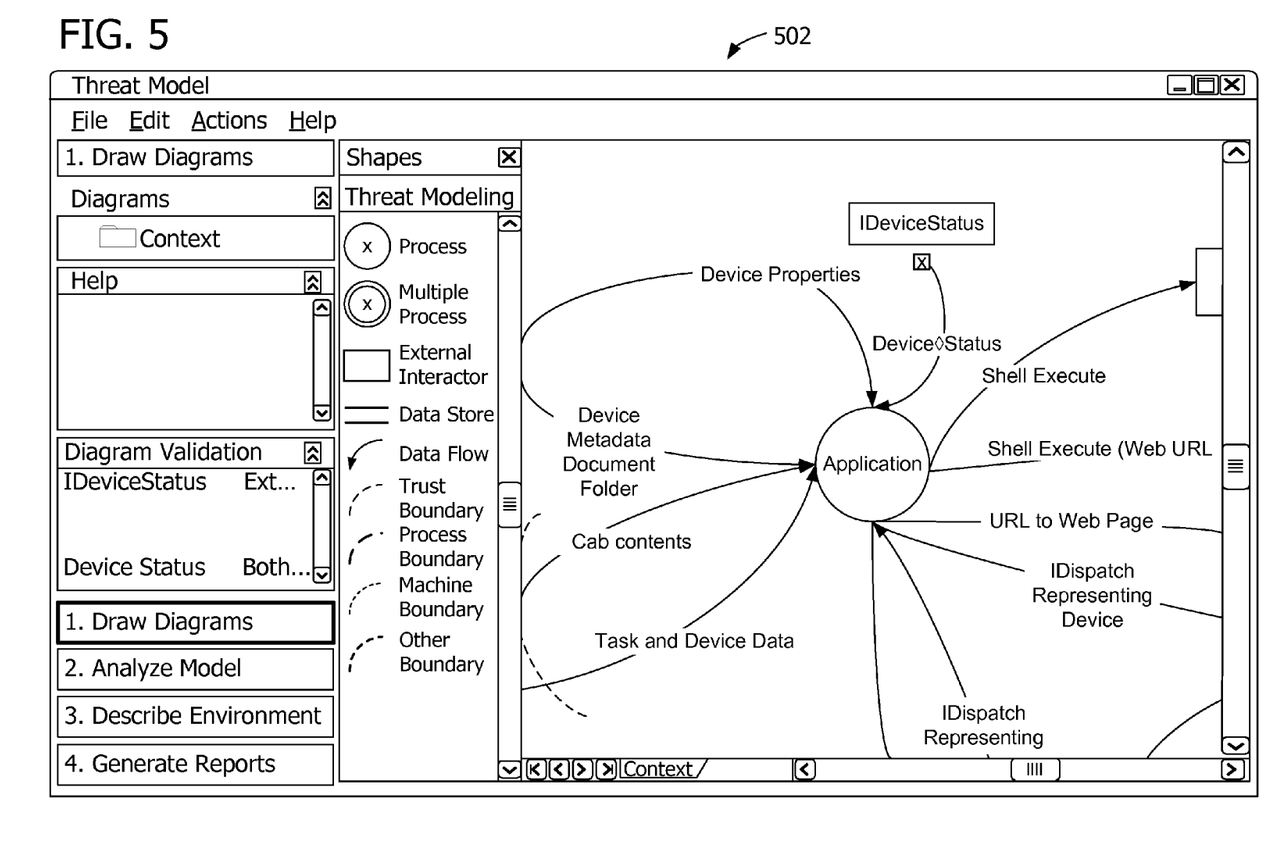
FIG. 5 is an exemplary user interface illustrating a threat modeling application applying structural validation to a threat model.

Referring to the figures, embodiments of the invention enable the analysis of a threat model 112. In some embodiments, a threat modeling application 108 executes on a computing device operated by a user or other entity and analyzes a data flow diagram 110 and the threat model 112 stored in a data store associated with the computing device. The data flow diagram 110 includes a plurality of elements 118 arranged to describe a flow of data through an information system (see FIG. 5). Exemplary elements in the data flow diagram 110 such as "IDeviceStatus" and "Application" are illustrated in FIG. 5.

Figure 1:
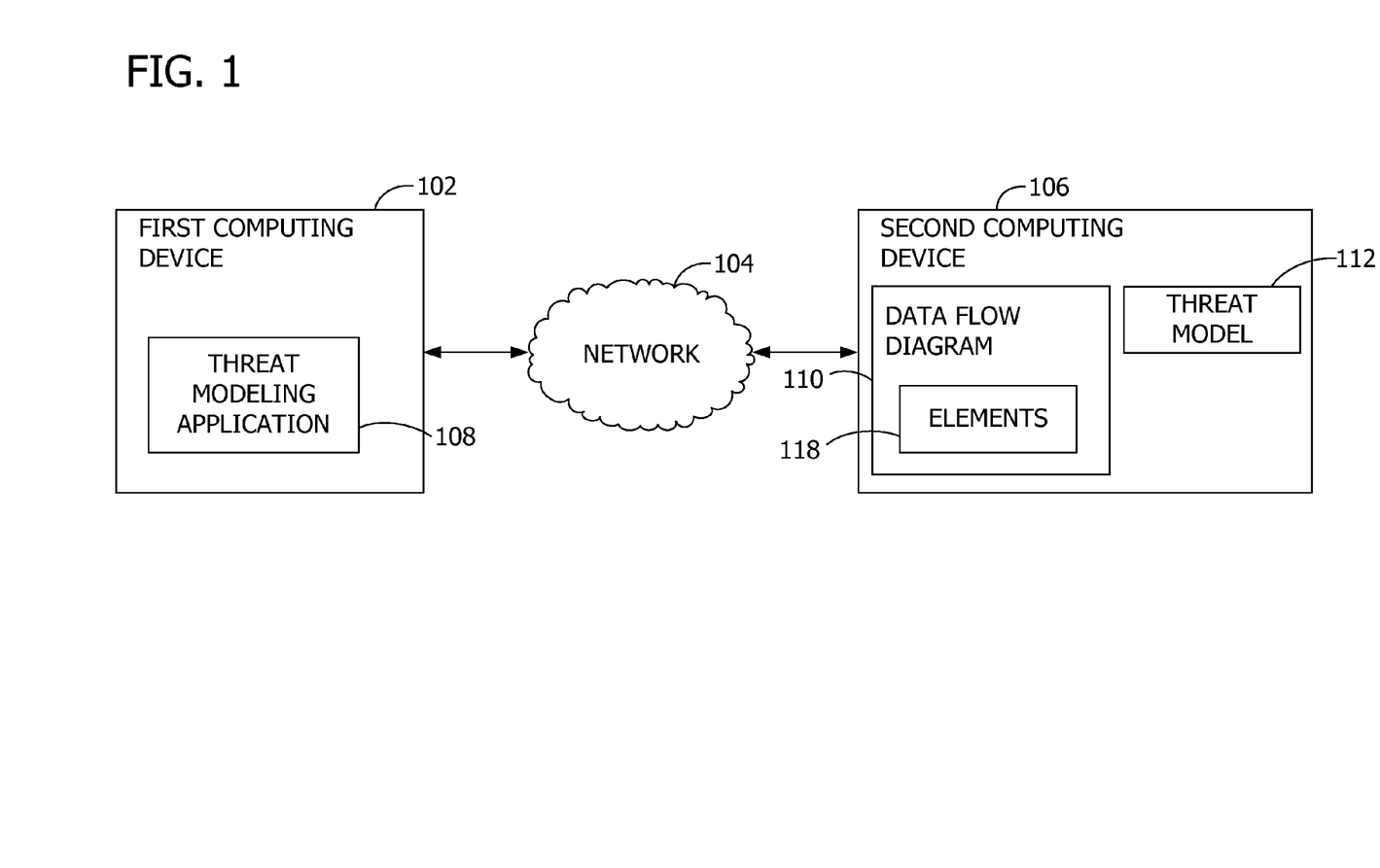
FIG. 1 is an exemplary block diagram illustrating an operating environment suitable for use in implementing embodiments of the invention.

In other embodiments, the user (e.g., at a second computing device 106) sends portions of the data flow diagram 110 and a corresponding threat model such as threat model 112 to a first computing device 102 via a network 104. The first computing device 102 includes the threat modeling application 108 that provides an analysis of the threat model 112 being evaluated. The evaluation of the threat model 112 is based on, for example, structural validity and descriptive completeness. In embodiments, the threat modeling application 108 provides structural feedback, completeness feedback, and an overall score or progress indicator regarding the threat model 112. Exemplary scores regarding a type of error encountered for a particular threat are illustrated in Appendix A. In embodiments, the structural feedback identifies structural defects of the threat model 112 in real-time or near real-time (e.g., as the data flow diagram 110 is being created or read). The completeness feedback identifies elements (e.g., elements 118 of the threat model 112) that, for example, do not have possible threats, have threats that are not described, have unmitigated threats, or have threats not associated with an issue tracking identifier (e.g., bug number).

While aspects of the invention are described with reference to threat modeling for application programs, aspects of the invention are operable generally with information systems including software systems having one or more application programs, processes, and/or data stores. Further, while the user provides the data flow diagram 110 and the threat model 112 in some embodiments, other embodiments contemplate the threat modeling application 108 accessing either or both of the data flow diagram 100 and the threat model 112 independent of the user.

Figure 2:
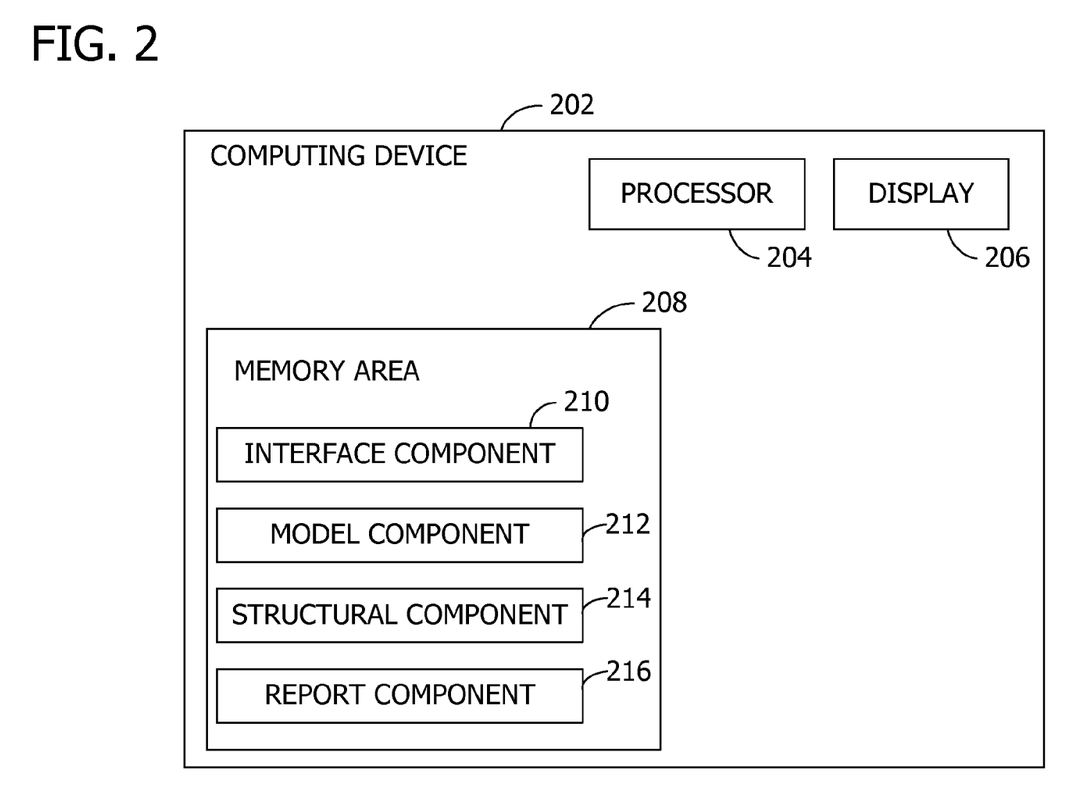
FIG. 2 is an exemplary block diagram of a computing device having a memory area storing components for evaluating threat models.
Figure 3:
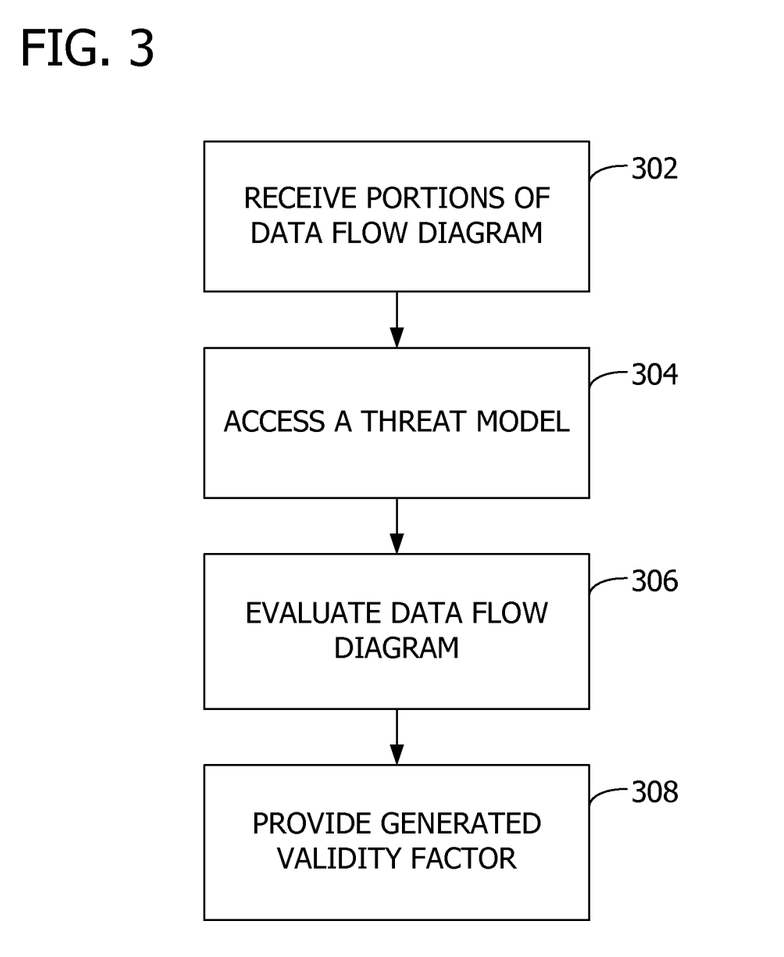
FIG. 3 is an exemplary user interface illustrating a threat modeling application.

Referring next to FIG. 2, an exemplary block diagram shows a computing device 202 having at least one processor 204, a display 206, and a memory area 208. In an embodiment, the processor 204 is transformed into a special purpose microprocessor by executing computer-executable instructions or by otherwise being programmed. For example, the processor 204 is programmed with instructions such as illustrated in FIG. 3 to evaluate the threat model 112. The diagram of FIG. 2 is merely illustrative of an exemplary computing device that may be used in connection with one or more embodiments of the invention, and is not intended to be limiting in any way.

With continued reference to FIG. 2, memory area 208, or other computer-readable media, stores computer-executable components for evaluating threat models, for example, the threat model 112. Exemplary components within the memory area 208 include, but are not limited to an interface component 210, a model component 212, a structural component 214, and a report component 216.

The interface component 210 accesses the data flow diagram 110 for an information system. In some embodiments, the interface component 210 displays the accessed data flow diagram 110 to a user as a two-dimensional model (see FIG. 5) or as a rotatable three-dimensional model (see FIG. 11). The interface component 210 further accesses the threat model 112 corresponding to the data flow diagram 110. The threat model 112 has one or more threat types corresponding to each of the plurality of the elements 118. The interface component 210 receives a request from the user for a determined progress factor and provides to the user, responsive to the received request from the user, a determined progress factor for each of the threat types. In other embodiments, the progress factor is determined and provided automatically in a user interface or report.

In embodiments, the model component 212 evaluates a description in the threat model 112 of each of the threat types for each of the corresponding elements 118 to generate a completeness factor for the threat type. Exemplary descriptions of threat types may be found in FIG. 6. The model component 212 identifies empty threats or undescribed threats that are associated with one of the element 118 and have a threat type without any details. The model component 212 also identifies unmitigated threats that are associated with one of the elements 118 and have a threat type but no description of how the software system responds to the threat or mitigates the threat. This may occur, for example, if the user has not completed filling out the description in the threat model 112.

The structural component 214 evaluates connections between the elements 118 in the data flow diagram 110 accessed by the interface component 210 to generate a validity factor for each of the threat types. In embodiments, evaluating the connections between each of the elements 118 includes evaluating logical connections between the elements 118 and evaluating spatial connections between the elements 118. For example, as shown In FIG. 5, "DeviceStatus" is connected to element "Application" but is not connected to element "IDeviceStatus." Therefore, this disconnect will affect the validity factor for that particular threat.

In some embodiments, logical evaluation includes the examination of only the abstract layout, or graph, of the data flow diagram 110 in the threat model 112. In such an embodiment, the threat modeling application 108 iterates through a list of the elements 118 in the data flow diagram 110 and compares adjacent elements. In some cases, the threat modeling application 108 follows chains of connected elements 118 until particular types of elements 118 are found or not found. In contrast, spatial evaluation examines the two-dimensional layout of the threat model 112 for errors, such as the spatial relationships of trust boundaries (see FIG. 10).

Referring back to FIG. 2, the report component 216 determines the progress factor for each of the threat types based on the completeness factor generated by the model component 212 and the validity factor generated by the structural component 214. The interface component 210 provides the progress factor determined by the report component 216 for each of the threat types to the user as an indication of the effectiveness of the threat model 112. In embodiments, the report component 216 assigns a first weight to the completeness factor based on the evaluated description, assigns a second weight to the validity factor based on the evaluated connections, and combines the completeness factor and the validity factor based on the first weight and the second weight to determine the progress factor. The assignment of the first and second weights is configurable by, for example, the user or model reviewer, and no particular ordering of the weights is implied by the terms "first" and "second."

Referring next to FIG. 3, portions of the data flow diagram 110 for an information system are received at 302. In some embodiments, the portions of the data flow diagram 110 are received from the user via a user interface. In further embodiments, the portions of the data flow diagram 110 are received from an extensible markup language (XML) file corresponding to the data flow diagram 110.

At 304, the threat model 112 corresponding to the received portions of the data flow diagram 110 is accessed. While the embodiment of FIG. 3 illustrates the validity factor being determined as a function of both the data flow diagram 110 and the threat model 112, other embodiments include the validity factor being determined as a function of either the data flow diagram 110 (e.g., structural validity) or the threat model 112 (e.g., descriptive completeness), but not both.

At 306, connections between the elements 118 in the portions of the data flow diagram 110 are evaluated as the portions are received to generate a validity factor for each of the threat types. In embodiments, the connections are evaluated in real-time as the portions are received by the threat modeling application 108 in the first computing device 102. The evaluation identifies structural defects. For example, the portions are sent from the second computing device 106 to the first computing device 102 as the user creates the data flow diagram 110. In further embodiments, evaluating the connections includes one or more of the following: identifying intersections between the connections, identifying one or more of the elements 118 lacking a connection to another of the elements 118, identifying a data store element lacking a connection to a process element via a data flow element, and identifying a trust boundary element lacking a data flow element crossing over the trust boundary element.

Figure 8:
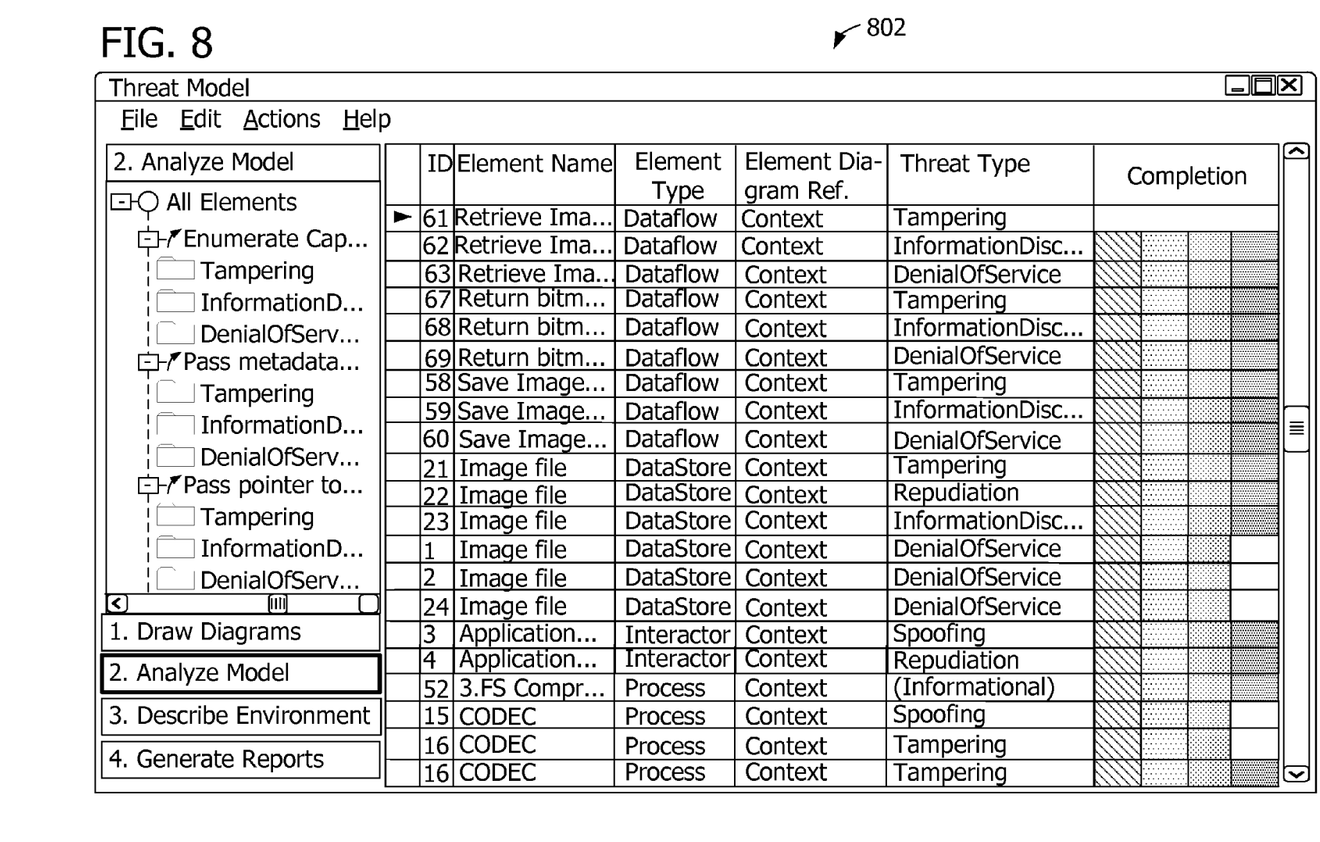
FIG. 8 is an exemplary user interface illustrating a generated threat model listing completion status of possible threats after an evaluation.

At 308, a generated validity factor is provided to the user for analysis of the threat model 112. In embodiments, providing the generated validity factor includes providing an incremental progress bar (e.g., a completion progress bar as shown in FIG. 8) for display to the user. In further embodiments, the incremental progress bar corresponds to the generated validity factor and/or completeness factor.

Figure 4:
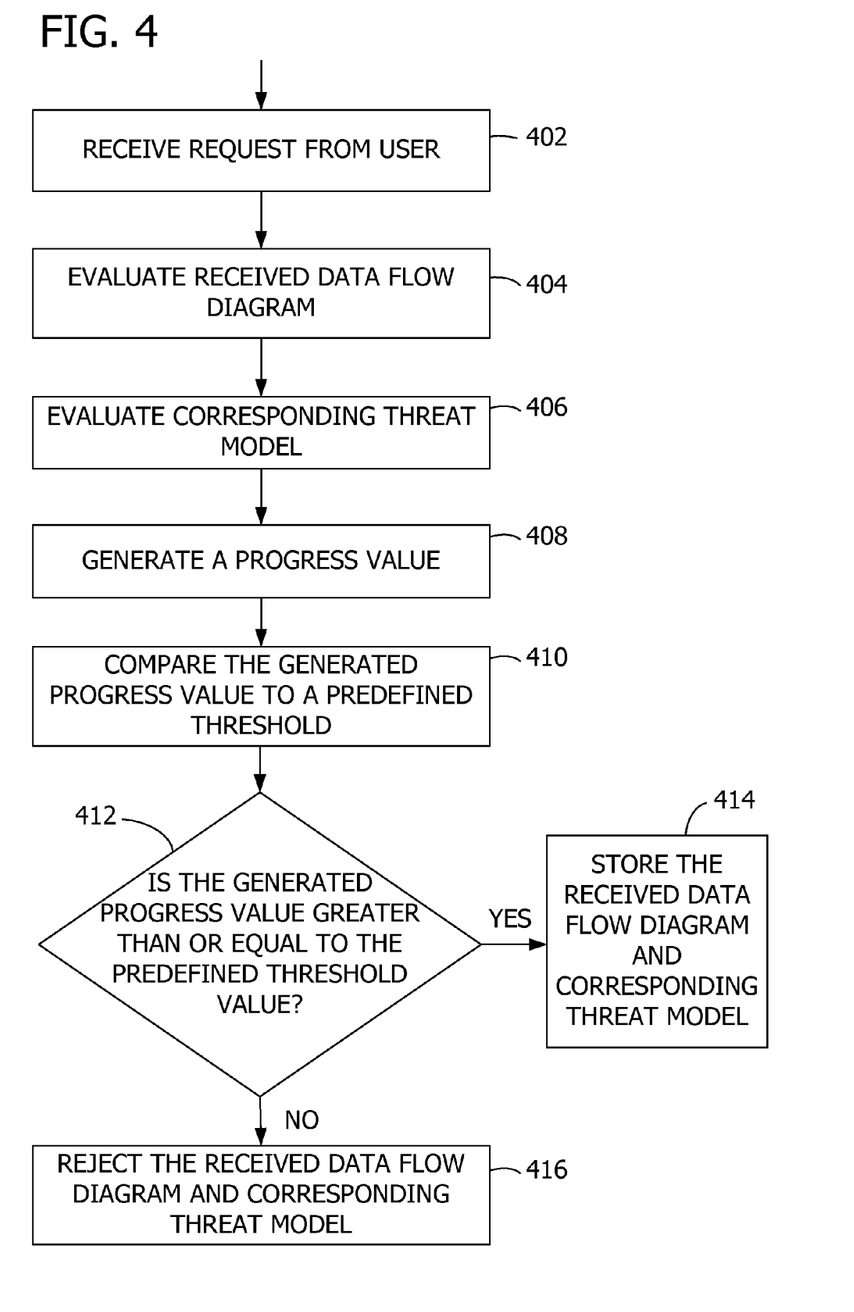
FIG. 4 is an exemplary flow chart illustrating an evaluation of a threat model.

Referring next to FIG. 4, an exemplary flow chart illustrates the actions performed in evaluating the threat model 112. At 402, a request from the user to store the data flow diagram 110 and the corresponding threat model 112 in the memory area 208 is received at the first computing device 102. At 404, the received data flow diagram 110 is evaluated for structural validity. At 406, the corresponding threat model 112 is evaluated for descriptive completeness. At 408, a progress value for the received data flow diagram 110 and the corresponding threat model 112 is generated based on the evaluation of the received data flow diagram 110 and the corresponding threat model 112. At 410, the generated progress value is compared to a predefined threshold value. In embodiments, the predefined threshold value corresponds to a minimum level of effectiveness of the corresponding threat model 112. At 412, a determination is made as to whether the generated progress value is greater than or equal to the predefined threshold value. If it is determined that the generated progress value is greater than or equal to the predefined threshold value, at 414, the received data flow diagram 110 and the corresponding threat model 112 are stored in the memory area 208. However, if it is determined that the generated progress value is less than the predefined threshold value, at 416, the received data flow diagram 110 and the corresponding threat model 112 are rejected. In embodiments, the user is notified of the rejection of the received data flow diagram 110 and the corresponding threat model 112.

In some embodiments, FIG. 4 represents an online validation system, web service, or plug-in that evaluates threat models 112. For example, if the threat model 112 meets a particular format (e.g., XML format), a validation engine evaluates and scores the threat model 112.

Referring next to FIG. 5, an exemplary user interface 502 illustrates an exemplary threat modeling application (e.g., threat modeling application 108) or other threat modeling tool applying structural validation to an example of the threat model 112. In the exemplary threat model illustrated in the user interface 502, a square shape "IDeviceStatus," an external interactor element, is isolated from the rest of the diagram, and the curved arrow "DeviceStatus" is not connected at both ends. Therefore, on the left side of the user interface 502, under "DiagramValidation," the threat modeling application 108 identifies two problems upon applying a structural validation and informs the user of the identified problems.

Figure 6:
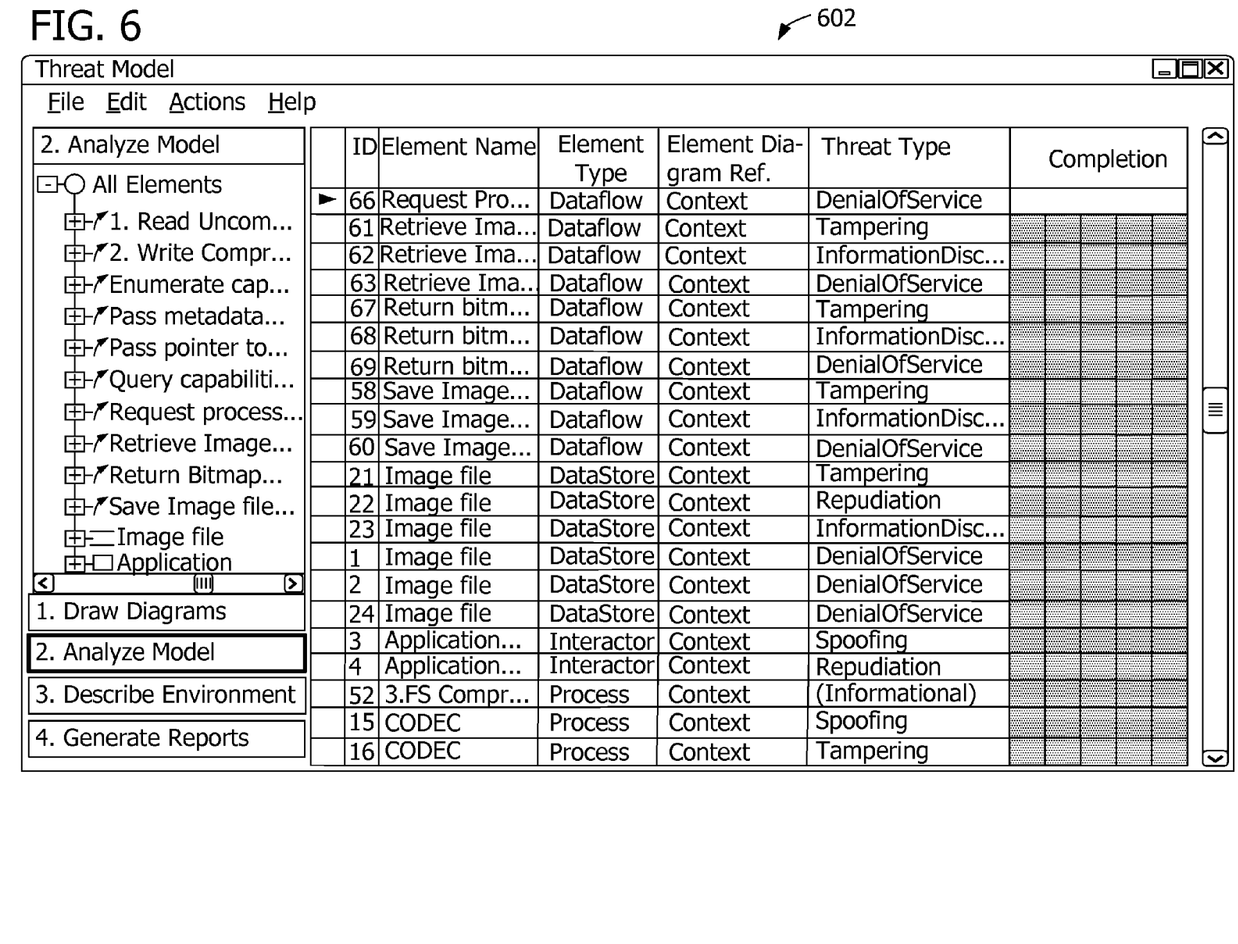
FIG. 6 is an exemplary user interface illustrating a generated threat model listing completion status of possible threats before an evaluation.

Referring next to FIG. 6, an exemplary user interface 602 illustrates a generated threat model 112 and a completion status of possible threats identified by the threat modeling application 108. The threat model 112 in the user interface 602 lists the element names, corresponding element types, and threat types. The completion status is indicated by the progress bar. In the example of FIG. 6, the progress bar is illustrated as a series of segmented rectangles. The progress bar may be color-coded, textured, or crosshatched based on a value associated with the progress factor (e.g., a level of completeness and structural validity). Each segmented rectangle or each progress bar under the "completion" column may be color-coded based on the type of description of the possible threat. In some embodiments, the progress bar is illustrated as a gradient of color from left-to-right in FIG. 6. For example, progress bars showing mostly red indicate a mostly incomplete description and/or structural validity for the threat. Similarly, progress bars showing mostly green indicate a mostly complete description and/or structural validity for the threat. In some embodiments, each segment in the rectangles corresponds to a particular milestone or decision component involved in determining the progress factor. Exemplary milestones and decision components are next described with reference to FIG. 7.

Figure 7:
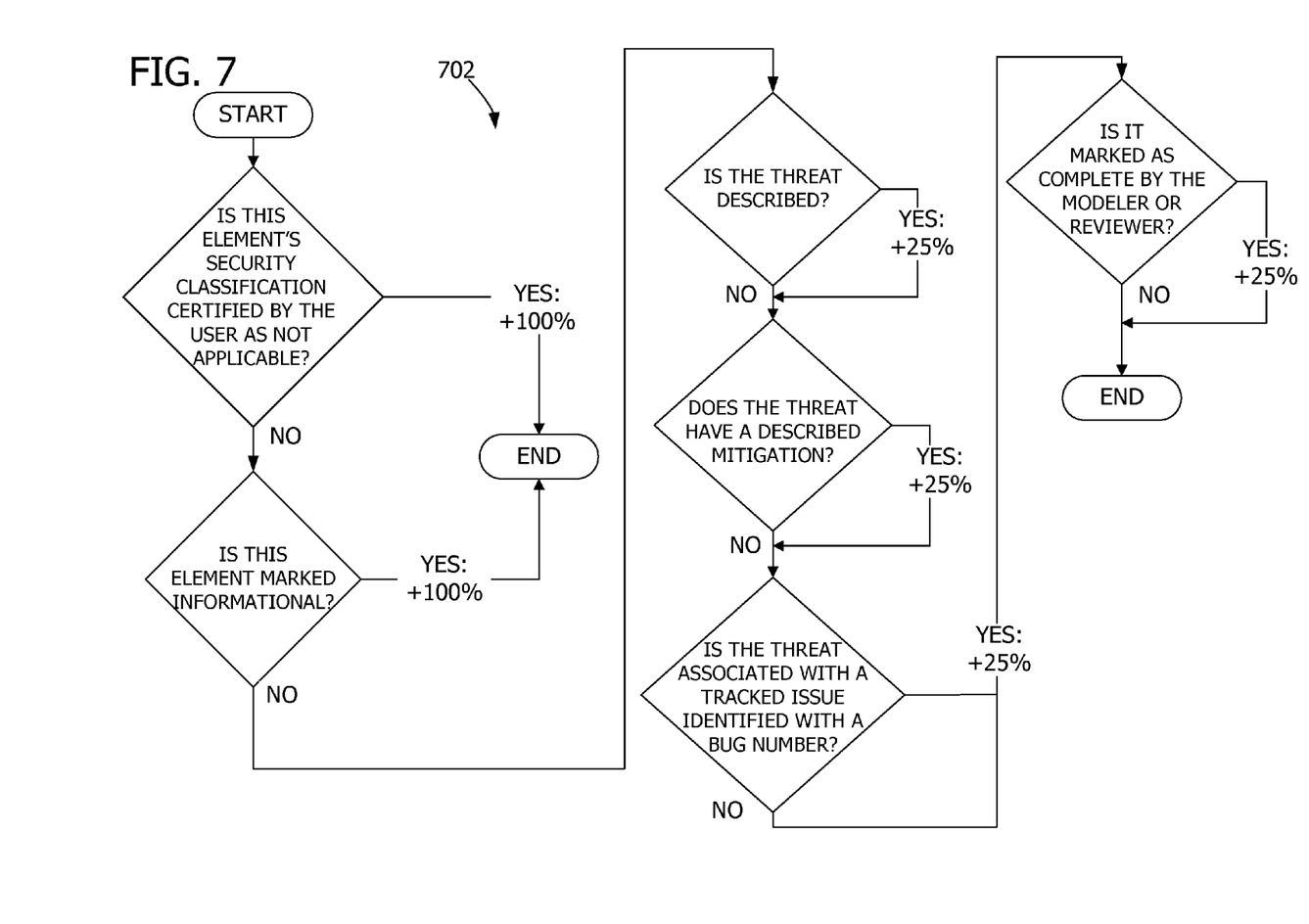
FIG. 7 is an exemplary flow chart illustrating a decision making process in determining a completion status of possible threats.

Referring next to FIG. 7, an exemplary flow chart 702 illustrates a decision making process in determining the completion status of possible threats. Following the flow chart 702, the questions asked regarding the description of a threat determine the length of a completion progress bar. For example, if a threat is described, a completion progress bar advances 25%. The incrementing of, for example, 25% as shown in the flow chart 702 is exemplary and other increments of increasing the completion progress bar are within the scope of embodiments of the invention.

The exemplary flow chart 702 illustrates certifications. Certifications correspond to elements 118 and threat types for which the user or other modeler has certified that there are no threats of a given type at all. The flow chart 702 also illustrates a decision box for omitting evaluation of informational elements, or elements 118 included in the threat mode for context reasons but not threat-related reasons.

Referring next to FIG. 8, an exemplary user interface 802 illustrates a generated threat model 112 including the completion status of possible threats identified by the threat modeling application 108 after an evaluation of the possible threats. For example, user interface 802 illustrates the results of each threat being processed through a decision tree such as shown in flow chart 702. The progress bars shown in the user interface 802 illustrate a level of completion of each of the listed threats by associating the completion of a threat with a length of the completion progress bar. For example, a fully described threat has all four boxes under the "completion" column filled.

Figure 9:
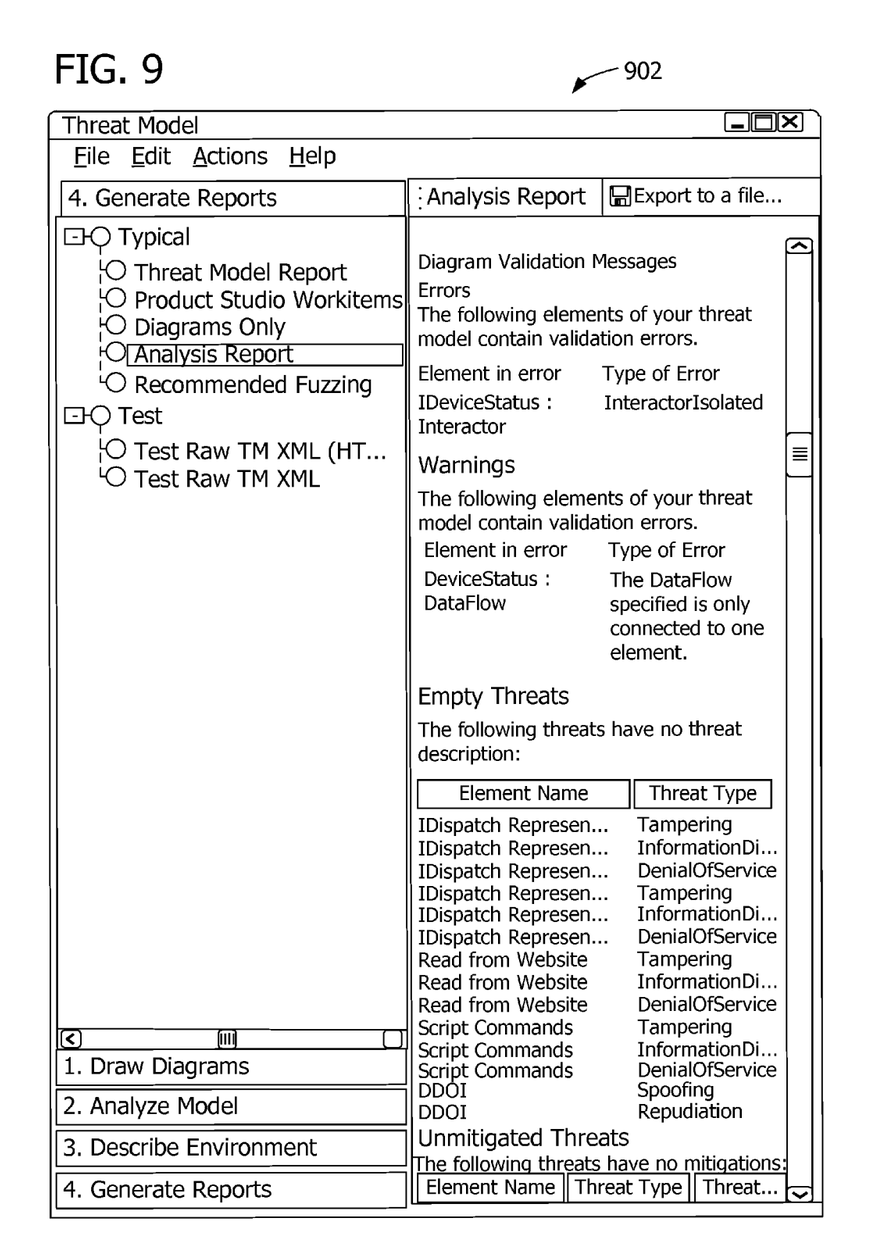
FIG. 9 is an exemplary user interface illustrating a generated analysis report of an evaluation of a threat model.

Referring next to FIG. 9, is an exemplary user interface 902 illustrating a generated analysis report of an evaluation of the threat model 112. As shown in the user interface 902, the analysis report includes, but is not limited to, a list of elements that are identified as including an error and the type of error associated with the particular element. For example, the section labeled "Empty Threats" identifies elements that contain no threat description. The data flow diagram corresponding to the threat model 112 for FIG. 9 has a validation score of −1200 based on the exemplary scores provided in Appendix A. That is, the validation score is computed as the sum of the scores for the DataFlowTooFewConnections error (−1000) and the InteractorIsolated error (−200).

In some embodiments (not shown), the user interface 902 displays fuzzing targets identified, selected, and recommended by the threat modeling application 108. The fuzzing targets represent opportunities to fuzz, or automatically generate random input for testing, in the software system corresponding to the data flow diagram 110.

Figure 10:
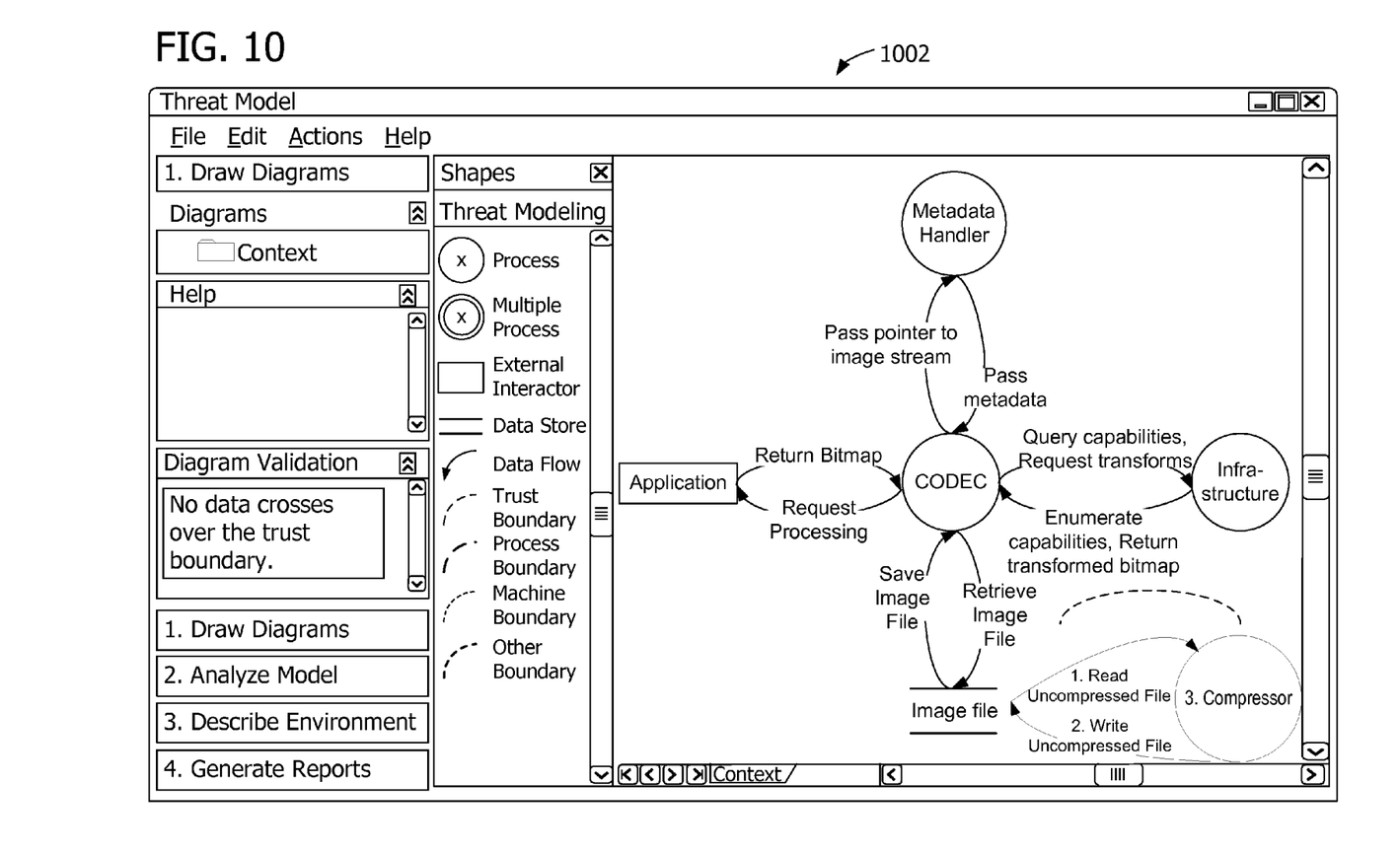
FIG. 10 is an exemplary user interface illustrating a data flow diagram.

Referring next to FIG. 10, an exemplary user interface 1002 illustrates an exemplary data flow diagram. The exemplary user interface 1002 is associated, for example, with the threat modeling application 108 or other threat modeling tool. The exemplary data flow diagram in the user interface 1002 corresponds to a compressor-decompressor (CODEC). A dotted line in the lower right-hand corner represents a trust boundary. The trust boundary is clearly not located spatially close enough to, or intersecting with, any element 118 to imply an association. As such, when evaluating the structural completeness of this exemplary data flow diagram 110, the threat modeling application 108 identifies this trust boundary as an error.

Appendix B includes an exemplary threat model report detailing the descriptive completeness of the data flow diagram 110, but omitting the progress bars.

Figure 11:
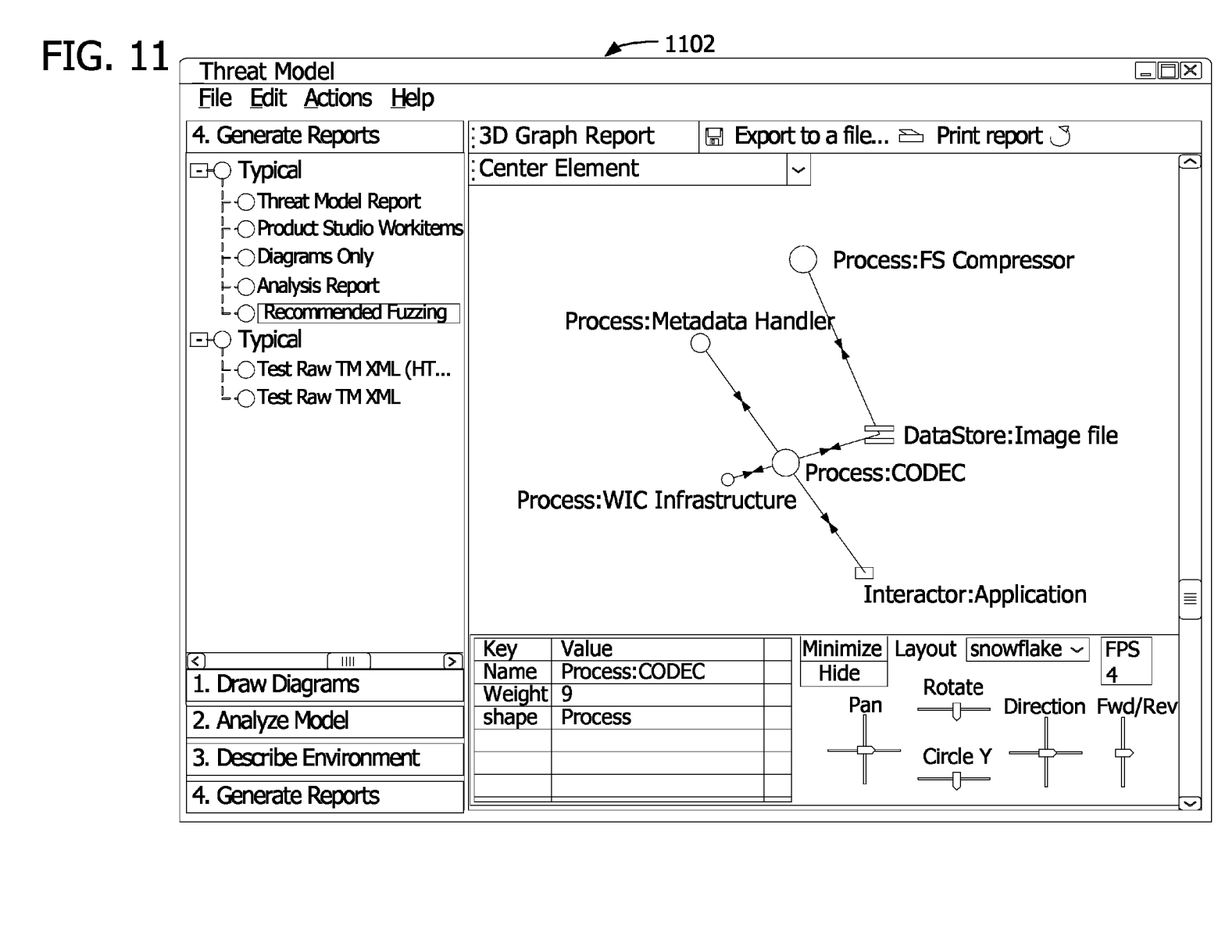
FIG. 11 is an exemplary user interface illustrating a three dimensional graph report of a data flow.

Referring next to FIG. 11, an exemplary user interface 1102 illustrates a three-dimensional model of a data flow diagram. That is, the interface component 210 displays an accessed data flow diagram to the user as a rotatable three-dimensional model.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for determining the descriptive completeness and structural validity of the received data flow diagram 110 and the corresponding threat model 112, and exemplary means for generating a value indicating an evaluation of the threat model 112.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Table A1 below lists some sample structural validations evaluated by the threat modeling application 108.

TABLE A1

Exemplary Structural Validations.

| Structural Validation | Explanation |
| --- | --- |
| DataFlowIsolated | A data flow element is not connected to any element. |
| DataFlowTooFewConnections | A data flow element is not connect at both ends. |
| InteractorIsolated | An external interactor element is not connected to any element. |
| InteractorTooFewConnections | An external interactor has only one connection. |
| ProcessIsolated | A process is not connected to any element. |
| ProcessTooFewConnections | A process has only one connection. |
| MultiProcessIsolated | A multiprocess element is not connected to any element. |
| MultiProcessTooFewConnections | A multiprocess has only one connection. |
| DataStoreIsolated | A data store element is not connected to any element. |
| DataStoreTooFewConnections | A data store has only one connection. |
| DataStoreConnectedToNonProcess | A data store must be connected only to a dataflow element that connects to a process. This is not the case. |
| DataStoreWithNoInputs | A data store must receive data from somewhere, or the model is incomplete. The data store does not receive data as it has no inbound data flows. |

TABLE A1-continued

Exemplary Structural Validations.

| Structural Validation | Explanation |
|---|---|
| DataStoreWithNoOutputs | A data store must emit data to somewhere, or the model is incomplete. (There is no point emitting data that will never be consumed.) This data store is not connected to an outbound data flow. |
| DataStoreNotConnectedToInteractor | A data store is not connected, through any number of inbound data flows and intermediate elements, with an external interactor. This would mean that the data has no source, so the model is (very likely) incomplete. |
| DataStoreNotConnectedFromInteractor | A data store is not connected, through any number of outbound data flows and intermediate elments, with an external interactor. This would mean that the data has no eventual use outside of the system, so the model is (very likely) incomplete. |
| TrustBoundaryIsolated | A trust boundary has no data flows crossing over it. It is either superfluous or misplaced. |
| TrustBoundaryNone | There are no trust boundaries, so the model is (very likely) not broad enough to be useful. |
| NoNonInformationalProcess | There are no processes or multiprocesses which are not marked as "informational" (present for context but not explicitly modeled). As a threat model reflects the flow and processing of data, it is (very likely) incomplete. |

An exemplary list of scores per type of problem determined in a threat model evaluation is shown below in Table A2. The structural validations correspond to those in Table A1 above.

TABLE A2

Exemplary Scores for Structural Validations.

| Score | Structural Validation |
|---|---|
| −200 | DataFlowIsolated |
| −1000 | DataFlowTooFewConnections |
| −200 | InteractorIsolated |
| −1000 | InteractorTooFewConnections |
| −200 | ProcessIsolated |
| −1000 | ProcessTooFewConnections |
| −200 | MultiProcessIsolated |
| −1000 | MultiProcessTooFewConnections |
| −200 | DataStoreIsolated |
| −1000 | DataStoreTooFewConnections |
| −200 | DataStoreConnectedToNonProcess |
| −200 | DataStoreWithNoInputs |
| −200 | DataStoreWithNoOutputs |
| −200 | DataStoreNotConnectedToInteractor |
| −200 | DataStoreNotConnectedFromInteractor |
| −200 | TrustBoundaryIsolated |
| −10000 | TrustBoundaryNone |
| −10000 | NoNonInformationalProcess |
| −1000000 | Unknown |

APPENDIX B

Listed below are portions of an exemplary threat model report corresponding to the data flow diagram illustrated in FIG. 10.
CODEC
  Threats:
  Tampering
  Threat #16: When we pass the stream pointer to the metadata handler, the metadata handler could do bad things.
  Mitigation #16: Where possible, we pass a substream rather than the full stream. A malicious metadata handler could access any part of the stream, but some metadata handlers require access to the entire stream because there could be references within the metadata block to metadata elsewhere in the file. This is an acceptable risk.
  Information Disclosure
  Threat #18: Writing an image file, the codec could write out an uninitialized buffer, and could put information into a file that shouldn't be there.
  Mitigation #18: Infrastructure allocates its own memory and zeros it out before using it.
  Information Disclosure
  Threat #3: In case an image is protected (or in a protected container) the image data could be left in memory and potentially accessible to another application if we don't zero out the memory after usage.
  Mitigation #3: Zero out memory after usage.
  Elevation of Privilege
  Threat #20: A bug in a codec could allow a buffer overrun that could lead to arbitrary code execution.
  Mitigation #20: We ensure strict compliance with image format specifications. We also do annotations.

What is claimed is:

1. One or more computer storage devices storing computer-executable components for evaluating a threat model for an information system, said components comprising:
  an interface component that when executed causes at least one processor to access a data flow diagram for an information system, said data flow diagram comprising a plurality of elements arranged to describe a flow of data through the information system, said interface component further accessing a threat model corresponding to the data flow diagram, said threat model having one or more threat types corresponding to each of said plurality of elements;

a model component that when executed causes at least one processor to evaluate a description in the threat model of each of the threat types for each of the corresponding elements to generate a completeness factor for the threat type, wherein the model component evaluates the description in the threat model at least by identifying one or more of the following associated with one of the elements and having a threat type: empty threats, undescribed threats, and unmitigated threats;

a structural component that when executed causes at least one processor to evaluate connections between the elements in the data flow diagram accessed by the interface component to generate a validity factor for each of the threat types; and a report component that when executed causes at least one processor to determine a progress factor for each of the threat types based on the completeness factor generated by the model component and the validity factor generated by the structural component, wherein the interface component provides the progress factor determined by the report component for each of the threat types to a user as an indication of effectiveness of the threat model.

2. The computer storage devices of claim 1, wherein evaluating the connections between each of the elements comprises evaluating logical connections between the elements by iterating through the elements in the data flow diagram and comparing adjacent elements.

3. The computer storage devices of claim 1, wherein evaluating the connections between each of the elements comprises evaluating spatial connections between the elements by examining a two-dimensional layout of the threat model for errors.

4. The computer storage devices of claim 1, wherein the report component further:
assigns a first weight to the completeness factor based on the evaluated description;
assigns a second weight to the validity factor based on the evaluated connections; and
combines the completeness factor and the validity factor based on the first weight and the second weight to determine the progress factor.

5. The computer storage devices of claim 1, wherein the interface component further displays the accessed data flow diagram to the user as a rotatable three-dimensional model.

6. The computer storage devices of claim 1, wherein the interface component further receives a request from the user for the determined progress factor and provides, responsive to the received request from the user, the determined progress factor for each of the threat types to the user.

7. A method comprising:
receiving portions of a data flow diagram for an information system, said portions of the data flow diagram comprising a plurality of elements arranged to describe a flow of data through the information system;
accessing a threat model corresponding to the data flow diagram, said threat model having one or more threat types corresponding to each of the elements;
generating a completeness factor for each of the one or more threat types by evaluating a description in the accessed threat model of each of the one or more threat types for each of the corresponding elements, wherein evaluating the description includes at least identifying one or more of the following associated with one of the elements and having a threat type: empty threats, undescribed threats, and unmitigated threats;
evaluating, by one or more processors, connections between the elements in the portions of the data flow diagram as the portions are received to generate a validity factor for each of the one or more threat types, wherein evaluating includes identifying structural defects in the data flow diagram; and
providing the generated completeness factor and the generated validity factor for analysis of the threat model.

8. The method of claim 7, wherein receiving the portions of the data flow diagram comprises receiving the portions of the data flow diagram from a user via a user interface.

9. The method of claim 7, wherein receiving the portions of the data flow diagram comprises receiving the portions of the data flow diagram from an extensible markup language (XML) file corresponding to the data flow diagram.

10. The method of claim 7, wherein evaluating the connections comprises evaluating the connections in real-time as the portions are received, the method further identifying undescribed threats associated with the one or more elements.

11. The method of claim 7, wherein the validity factor is affected by disconnection between at least two elements in the data flow diagram.

12. The method of claim 7, wherein providing the generated validity factor comprises providing an incremental progress bar for display to a user, said incremental progress bar corresponding to the generated validity factor.

13. The method of claim 7, wherein evaluating the connections comprises identifying intersections between the connections.

14. The method of claim 7, wherein evaluating the connections comprises one or more of the following: identifying one or more of the elements lacking a connection to another of the elements, identifying a data store element lacking a connection to a process element via a data flow element, and identifying a trust boundary element lacking a data flow element crossing over the trust boundary element.

15. The method of claim 7, wherein evaluating the connections between the elements comprises evaluating spatial connections between the elements by examining a two-dimensional layout of the threat model for errors.

16. A system comprising:
a memory area for storing a data flow diagram for an information system, said data flow diagram comprising a plurality of elements arranged to describe a flow of data through the information system, said memory area further storing a threat model corresponding to the data flow diagram, said threat model having one or more threat types corresponding to each of said plurality of elements; and
a processor programmed to:
generate a completeness factor for each of the one or more threat types by evaluating a description in the threat model of each of the one or more threat types for each of the corresponding elements, wherein evaluating the description includes at least identifying one or more of the following associated with one of the elements and having a threat type: empty threats, undescribed threats, and unmitigated threats;
generate a validity factor for each of the one or more threat types by evaluating connections between the elements in the received data flow diagram;
determine a progress factor for each of the one or more threat types based on the generated completeness factor and the validity factor; and
provide the determined progress factor for each of the threat types to a user as an indication of effectiveness of the threat model.

17. The system of claim 16, wherein the memory area and the processor are associated with a first computing device, wherein the user is associated with a second computing device, and wherein the first computing device and the second computing device communicate via a network.

18. The system of claim 16, wherein the processor is further programmed to store the data flow diagram and the corresponding threat model in the memory area based on a comparison of the determined progress factor and a predefined threshold value.

19. The system of claim 16, wherein the processor is further programmed to reject, based on a comparison of the determined progress factor and a predefined threshold value, a request from the user to store the data flow diagram and the corresponding threat model in the memory area.

20. The system of claim 16, wherein evaluating the connections between the elements in the received data flow diagram comprises evaluating spatial connections between the elements by examining a two-dimensional layout of the threat model for errors.

* * * * *